(No Model.)

E. M. STURGES.
HAME FASTENER.

No. 366,275. Patented July 12, 1887.

Witnesses.
E. D. Smith
C. E. Ruggles

Inventor.
Edmond M. Sturges
By
A. M. Wooster
Atty.

UNITED STATES PATENT OFFICE.

EDMOND M. STURGES, OF WEST STRATFORD, CONNECTICUT.

HAME-FASTENER.

SPECIFICATION forming part of Letters Patent No. 366,275, dated July 12, 1887.

Application filed April 11, 1887. Serial No. 234,349. (No model.)

*To all whom it may concern:*

Be it known that I, EDMOND M. STURGES, a citizen of the United States, residing at West Stratford, in the county of Fairfield and State of Connecticut, have invented certain new and useful Improvements in Hame-Fasteners; and I do hereby declare the following to be a full, clear, and exact description of the invention, such as will enable others skilled in the art to which it appertains to make and use the same.

My invention has for it object to produce a device of this class which shall be simple in construction, inexpensive to make, easy to operate, positive, and which may be readily attached to and detached from any hames at any time without requiring skilled labor, and without recessing or changing the hames or adding any parts thereto. With these ends in view I have devised the simple and novel construction of which the following description, in connection with the accompanying drawings, is a specification, numbers being used to indicate the several parts.

Figure 1:
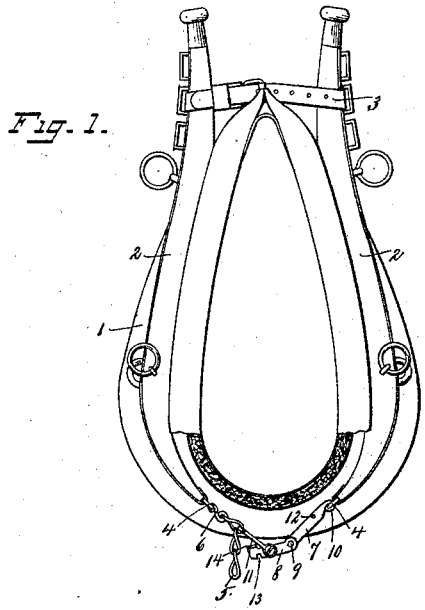
Figure 2:
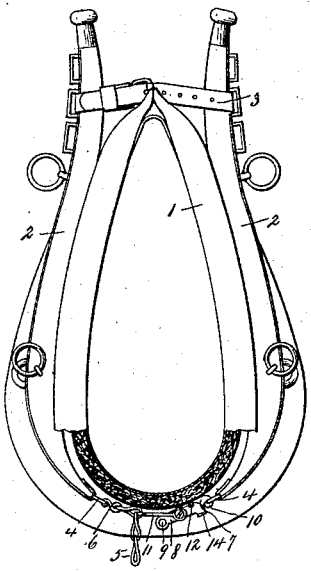
Figure 3:
Figure 5:
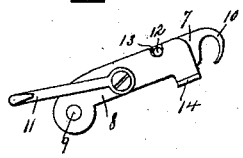
Figure 4:
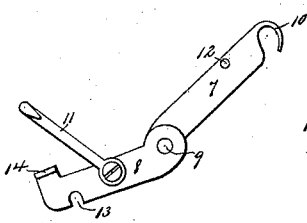

Figure 1 is an elevation of a horse-collar with hames in position thereon, illustrating my improved fastener in the unlocked position; Fig. 2, a similar view illustrating my improved fastener in the locked position. Figs. 3 and 4 are enlarged views of the two members of the fastener detached; and Fig. 5 is a view upon the same scale as Figs. 3 and 4, illustrating the position of the folding member of the fastener when locked upon a relatively larger-sized collar than that shown in Fig. 2.

1 denotes a horse-collar, and 2 hames, of ordinary construction, connected together by a strap, 3, at the top.

4 denotes the ordinary metallic loops at the bottom of the hames for the attachment of the fastening-straps which have heretofore been ordinarily used. To one of these loops, preferably the one upon the left hame, I attach one member of my improved fastener, which consists simply of a short chain, 5. This chain may be attached in any ordinary simple manner. I preferably use a small hook, 6, which is made the full width of loop 4, and is closed about it with a hammer to secure this member in place. The other member of the fastener consists of two folding plates, 7 and 8, joined together by a pivot, 9. At the upper end of plate 7 is a hook, 10, similar to hook 6, but made integral with the plate, which is closed about the loop on the hame in the same manner as loop 6, whereby this member of the fastener is secured in place.

11 denotes a hook pivoted to plate 8 and adapted to engage any of the links of chain 5.

By providing a number of links I insure ready adjustability, so that the device may be used upon collars of any size without change.

In use the hames are placed upon the collar in the usual manner, and hook 11 engaged with one of the links of chain 5. Plate 8 is then folded over plate 7, that is swung around from the position shown in Figs. 1 and 4 to the position shown in Figs. 2 and 5, which clamps the hames firmly together.

It is an essential feature of my invention that pivot 9, which connects the two plates and the point of attachment of hook 11 to plate 8, should be so located relatively to each other that when the plates are folded or swung to the locked position, as in Figs. 2 and 5, the said point of attachment of hook 11 will be carried upward past a horizontal line drawn through pivot 9, so that it will be impossible for the fastener to become detached in use, as the tendency of strain is to draw it tighter, it being wholly impossible to disconnect the members from each other without swinging plate 8 downward until the point of attachment of hook 11 thereto shall have passed below a horizontal line drawn through pivot 9.

In Fig. 2 I have shown my improved fastener as applied in connection with what is relatively a medium-sized collar, and in Fig. 5 I have shown the locked position of the folding member when the fastener is used upon a large-sized collar. In either event the parts are so constructed that in the folded or locked position the line of strain is above pivot 9, so that accidental disconnection of the parts cannot take place on any sized collar.

12 is a pin on plate 7, which serves as a stop to limit the upward movement of plate 8. 13 is a notch in the latter plate, which engages said pin, as shown in Fig. 5.

14 is a finger-piece for convenience in manipulating the fastener.

The special advantages of my improved fastener are that it can be readily attached to either metallic or wooden hames of any size without any cutting or change in the hames, and without any additional parts, and when worn out it may be readily detached and a new one substituted in its place. It will of course be understood that the exact shape of the parts and details of construction are not of the essence of my invention, and may be considerably varied without departing from the principle thereof.

I claim—

1. A hame-fastener consisting of a chain adapted for attachment to one hame, a plate adapted for attachment to the other hame, and a folding plate hinged to the lower end thereof, which is provided with a hook adapted to engage the chain, the point of attachment of said hook when in the folded position being above the pivotal point of the plates, so that the parts are locked in position, substantially as described.

2. A hame-fastener consisting of a chain having a hook for attachment to one hame, a plate, 7, having a hook for attachment to the other hame, a plate, 8, pivoted thereto, and a hook, 11, pivoted to plate 8 and adapted to engage the chain, whereby when said plates are folded the chain and hook 11 are caused to swing above the pivotal point of said plates and lock the hames firmly together.

3. The combination, with a pair of hames having the ordinary loops, 4, of a chain having a hook for attachment to one loop, and a plate, 7, having a hook for attachment to the other loop, a plate, 8, pivoted to plate 7, and a hook, 11, pivoted to plate 8 and adapted to engage either of the links of the chain, as and for the purpose set forth.

4. Chain 5, having hook 6, in combination with plate 7, having hook 10 and pin 12, plate 8, hinged to plate 7, and having a notch adapted to engage said pin to limit the movement of said plate when thrown to the folded position, and a hook, 11, pivoted thereto and adapted to engage the chain, as and for the purpose set forth.

5. In a hame fastener, a folding member consisting of a plate, 7, having a hook for attachment to a hame, and a stop-pin, 12, and a plate, 8, pivoted to plate 7, and having a pivoted hook for engagement to the other member, a notch to engage the stop-pin, and a finger-piece for convenience in operation.

In testimony whereof I affix my signature in presence of two witnesses.

EDMOND M. STURGES.

Witnesses:
A. M. WOOSTER,
THEO. E. SPENCER.